(12) United States Patent
Song et al.

(10) Patent No.: US 6,886,238 B2
(45) Date of Patent: May 3, 2005

(54) METHOD FOR MANUFACTURING A HEAD FOR RECORDING AND READING OPTICAL DATA

(75) Inventors: Ki Bong Song, Daejon-Shi (KR); Jeong Yong Kim, Daejon-Shi (KR); Kang Ho Park, Daejon-Shi (KR)

(73) Assignee: Electronics and Telecommunications Research Institute (KR)

( * ) Notice: Subject to any disclaimer, the term of this patent is extended or adjusted under 35 U.S.C. 154(b) by 228 days.

(21) Appl. No.: 10/032,989

(22) Filed: Dec. 27, 2001

(65) Prior Publication Data

US 2003/0185108 A1 Oct. 2, 2003

(30) Foreign Application Priority Data

Nov. 28, 2001 (KR) ........................................ 2001-74731

(51) Int. Cl.[7] .......................... G11B 5/127; H01L 21/311
(52) U.S. Cl. ................ 29/603.07; 29/852; 29/DIG. 16; 438/700; 438/701; 438/756
(58) Field of Search .......................... 29/603.07, 603.16, 29/603.18, 847, 852, DIG. 16; 438/694, 700, 701, 735, 737, 738, 756, FOR 100, FOR 131; 369/13.02, 13.33

(56) References Cited

U.S. PATENT DOCUMENTS 5,843,844 A * 12/1998 Miyanaga .................... 438/694
6,215,114 B1 * 4/2001 Yagi et al. ............... 438/735 X

FOREIGN PATENT DOCUMENTS

JP 3-139823 * 6/1991 ........ 438/FOR 100
KR 2000-046141 7/2000

OTHER PUBLICATIONS

Direct Observation of Selffocusing with subdiffraction limited resolution using near field scanning optical microscope; K. Song
High Throughput aperture near–field scanning optical microscopy; P. Minh.
Increased throughput of a near–field optical fiber probe over 1000 times by the use of a triple tapered structure; T. Yatsui.
High efficient excitation of optical near field on an apertured fiber probe with an asymmetric structure; T. Yatsui.

* cited by examiner

Primary Examiner—A. Dexter Tugbang
(74) Attorney, Agent, or Firm—Blakely Sokoloff Taylor & Zafman

(57) ABSTRACT

A method of manufacturing a head for recording and reading optical data. The method includes: providing a silicon substrate on which a silicon oxide film and a silicon deposition layer are stacked; etching the bottom of the silicon substrate by a given depth to form an opening; forming an aperture having a given slant angle in the silicon deposition layer located on the opening; etching the portion of the silicon oxide film, exposed through the opening; forming a dielectric layer on the silicon deposition layer including the aperture; removing an exposed portion of the bottom of the silicon deposition layer by a given thickness to expose a portion of the dielectric layer, forming a probe on the exposed portion of the dielectric layer and the silicon deposition layer exposed through the opening; and burying the aperture with a non-linear material.

12 Claims, 9 Drawing Sheets

METHOD FOR MANUFACTURING A HEAD FOR RECORDING AND READING OPTICAL DATA

BACKGROUND OF THE INVENTION

1. Field of the Invention

The invention relates generally to a head for recording/reading optical data and method of manufacturing the same, and more particularly to, a head for recording/reading optical data and method of manufacturing the same capable of improving throughput of a laser beam passing through apertures in order to record/read data in a probe type mode (AFM mode) (Atomic Force Microscopy) and a NSOM (Near-Field Scanning Optical Microscopy) mode.

2. Description of the Prior Art

In order to store more information per unit area in an optical storage device, it is required that the wavelength of a recording optical source be reduced or the numerical aperture of a condensing lens must be increased. To satisfy such a requirement, it may be considered to develop a blue laser diode (LD) and to increase the numeral aperture up to 1.0. In these cases, however, there is a limit that information is recorded with a high density due to diffraction of light, in a next generation information storage device requiring a high-density recording.

As an option for overcoming this limit, there are a SPR (Scanning Probe Recording) technology using a probe of AFM (Atomic Force Microscope), an ultra-resolution medium technology, a technology using a Near-Field Scanning Optical Microscopy (NSOM) probe that overcomes the diffraction limit of light and the like.

As a first example of a prior art, a technology using a NSOM optical fiber probe employs a laser light outputted to an aperture having a very small size (aperture: several dozens~several hundreds of nm). In case of the NSOM optical fiber probe, however, it is mechanically very fragile and is not easy to arrange it in plurality at a time. Further, as throughput of light outputted to the aperture is very small (generally about $10^{-5}$~$10^{-7}$ in cases of an aperture having 100 nm in size), the NSOM optical fiber probe is very difficult to be actually used in view of recording and data processing speed.

In other words, in order to use the NSOM optical fiber probe in an optical storage device, an aperture having a high throughput is required and a probe arranged in plurality and not easily abraded mechanically is required.

A second example of a prior art has a probe having a plurality of apertures through a semiconductor process (FIG. 1).

Referring now to FIG. 1, there are formed a plurality of holders 11 are provided. Probes 12 formed of a thin metal film are formed at the bottom of the holders 11. Apertures 13 are formed between the probes 12. Even in this case, however, as transmissivity of a laser beam outputted from the apertures 13 of the probes 12 is below $10^{-5}$ as in conventional optical fiber probe, it is required that transmissivity be increased. A method of improving throughput of light transmitted into a hole at an end portion of the probes 12 includes a method of exciting plasmon, a method of minimizing an optical loss region generated from one wavelength size at the end portion, etc.

The third example of a prior art attempted to improve throughput of the aperture by a method of exciting plasmon. Plasmon Mode, however, is difficult to effectively excite plasmon since its exciting efficiency depends on the polarization of an incident beam. In order to more effectively excite plasmon, there is a need for an aperture structure by which plasmon can be effectively excited through a special process.

A fourth example of a prior art include a method of making an aperture structure having a high throughput by making an end portion of the probe minimize an optical loss region. The method of minimizing the optical loss region, that is a method introduced in a conventional optical fiber probe, makes the aperture having a very large cone angle through a multi-step wet etching process. A reflection film for reflecting an incident light is located in a first taper region and a reflection film having a very large cone angle is located in a second taper region, so that the optical loss region can be reduced by maximum. Also, a very small aperture having a probe shape is positioned in a third taper region to form an aperture of high throughput. In this case, however, as the size of the aperture representing an optimum high throughput is defined depending on the first taper region and the aperture is manufactured by a multi-step wet etch process, there is a problem that its manufacturing process is complicated. Further, there is a problem that it could not be applied to an optical storage device of a probe mode since the end portion of the probe is very large.

Meanwhile, a fifth example of a prior art includes a method of manufacturing an aperture of a high throughput using semiconductor process and wet etch process. The method manufactures a probe the end portion of which has a parabolic structure of a very large cone angle through anisotropic etching process to silicon, a low-temperature oxide film formation process, a deposition process of Cr and a wet etching process in order to minimize the optical loss region. In case of this structure, however, as the process of manufacturing the probe including the low-temperature oxide film formation process is complicate, there is a problem that it is difficult to make the end portion of the probe in a parabolic shape.

The conventional arts so far attempted to improve throughput by making an actual object. However, there is a method by which a method similar to a method of manufacturing the aperture having a large cone angle is applied to a semiconductor process conceptually.

Referring now to FIG. 2, a sixth example of a prior art will be explained. A relatively large aperture (1 micron to 2 micron) is formed by a silicon semiconductor process and a reflection film is coated, where this structure corresponds to the first taper region mentioned in the fourth example of a prior art. At this time, a hole having a very small size (60 nm) is formed at the center of the reflection film to form an aperture of a high throughput. At this time, a non-linear thin film is additionally coated on the reflection film and self-focusing being a non-linear characteristic is generated through the nonlinear thin film, thus additionally improving the optical throughput of the aperture.

However, this method includes first forming a reflection film in the first taper region and then forming an aperture in the reflection film to form the aperture of a high throughput. However, this method is almost impossible to be used. The reason is that a mode of light reflected by the reflection film could not be effectively transferred to a mode existing in the aperture using only the first reflection film. Also, in this case, there is a region having a large light loss same to a conventional optical fiber probe. Further, though a thin film for causing self-focusing is additionally coated on the reflection film, there actually occurs no any self-focusing phenomenon. The reason is that the refractive index varies spatially in an already-formed structure since the refractive index is spatially different depending on the non-linear characteristic. Due to this, the difference in the phase delay is spatially generated to change the size and shape of beam, so that the amount of beam can be increased since a defocusing phenomenon not self-focusing can be generated. In other words, as the structure in which the non-linear thin film is coated on the reflection film has a limit to reduce the amount of beam (about one wavelength), throughput of light is not so increased. Further, this structure has a structure in which the end portion of the probe is very flat not a probe shape structure. Therefore, there is a problem that this structure could not be applied to an optical storage device using the probe mode though it could be simultaneously applied to the probe mode and the near-field scanning optical microscopy.

SUMMARY OF THE INVENTION

The present invention is contrived to solve these problems and an object of the present invention is to provide a head for recording/reproducing optical data that generates self focusing and in which an aperture is fully filled with a material having a three dimension non-linear coefficient, and method of manufacturing the same, which can reduce the amount of beam by about half wavelength, focus beam in a parabolic shape having almost no optical loss to effectively excite a near-field scanning optical microscopy to the aperture at an end portion of a probe and improve the throughput of the probe than several hundreds times than a conventional optical fiber probe.

In order to accomplish the above object, a head for recording/reading optical data according to the present invention is characterized in that it comprises a plurality of apertures formed in a silicon deposition layer an end portion of which is connected to a silicon substrate, a plurality of probes formed at the bottom of the silicon deposition layer at a region where the plurality of the apertures are formed, and a non-linear material buried within the plurality of the apertures.

A head for recording/reading optical data according to another embodiment of the present invention is characterized in that it comprises a silicon layer an end portion of which is connected to a silicon substrate and the bottom of which has a probe shape, a plurality of apertures formed in the silicon layer of the probe shape, a thin metal film formed on the silicon layer including the plurality of the apertures, and a non-linear material buried within the plurality of the apertures.

A method of manufacturing a head for recording/reading optical data according to another embodiment of the present invention is characterized in that it comprises the steps of providing a silicon substrate on which a silicon oxide film and a silicon deposition layer are stacked; etching the bottom of the silicon substrate by a given depth to form an opening; forming an aperture having a given slant angle in the silicon deposition layer located on the opening; forming a prove in the silicon deposition layer around the aperture exposed through the opening; and burying the aperture with a non-linear material.

The non-linear material generates a self-focusing phenomenon and is made of a material a third non-linear coefficient of which is very great. The non-linear material is made of $As_2S_3$ and is buried at the temperature of about 120° C.

The present invention discloses a head for recording/reading optical data having an aperture of a high transmissivity by which an optical throughput of a probe necessary to record and reproduce optical data is improved by over 100 times compared to a conventional optical fiber probe using a self-focusing phenomenon, and method of manufacturing the same.

Further, the present invention can manufacture an aperture throughput of which is improved, by effectively optically inducing its effect through a simple semiconductor process without mechanically changing a structure of a probe end portion through a multi-step semiconductor process as in a prior art, in order to improve throughput. In addition, the present invention can manufacture an aperture of a high throughput that can be arranged in plurality.

Additionally, the aperture the throughput of which is improved using a self-focusing phenomenon can be applied in manufacturing a probe type near-field scanning optical microscopy that is arranged in plurality. The aperture can also be applied to a probe type head where a dielectric material film is formed in the aperture and a thin metal film is then formed on the dielectric material film. Therefore, the present invention can be applied both to a probe type mode (AFM mode: Atomic Force Microscopy) and a NSOM (Near-Field Scanning Optical Microscopy) mode.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
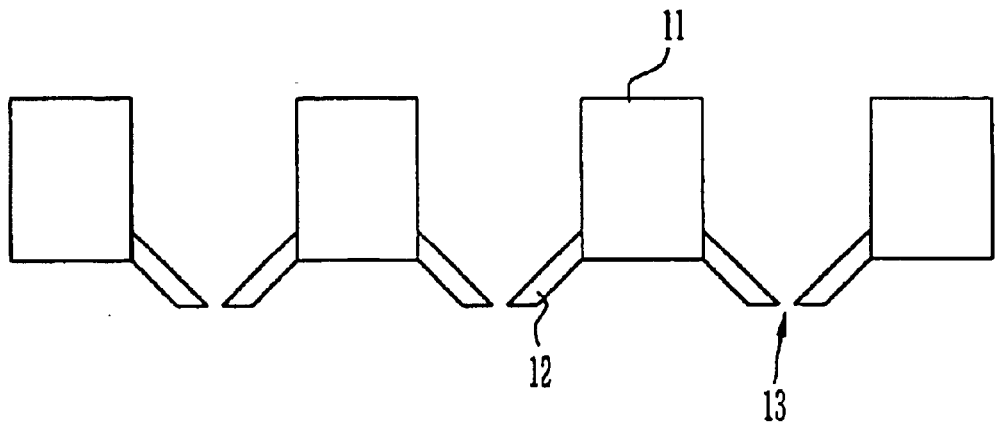
FIG. 1 is a cross-sectional view of a probe having a plurality of apertures.
Figure 2:
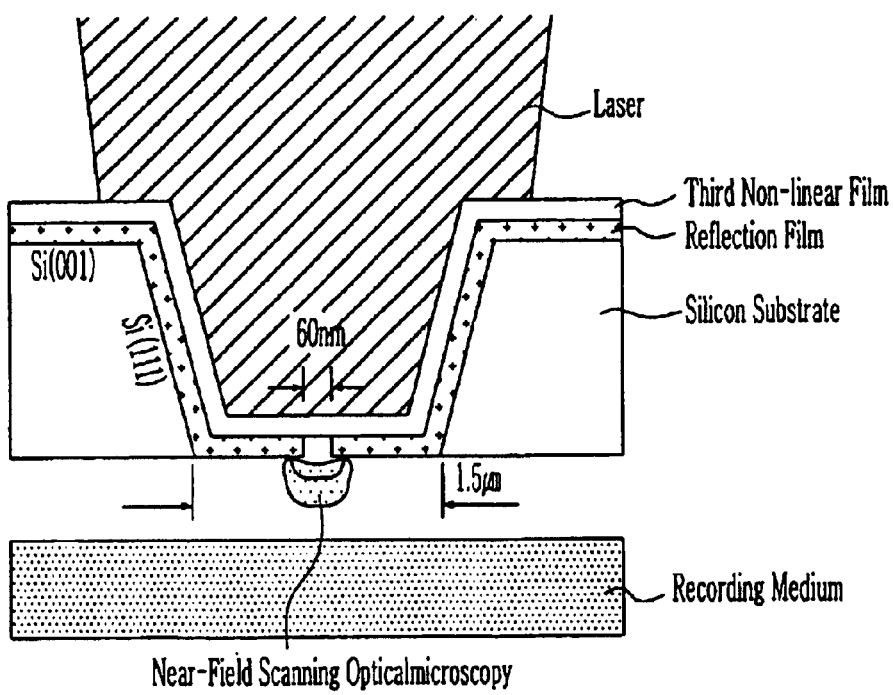
FIG. 2 is a cross-sectional view of a conventional near-field scanning optical microscopy (NSOM) optical head.

The present invention will be described in detail by way of a preferred embodiment with reference to accompanying drawings, in which like reference numerals are used to identify the same or similar parts.

Figure 3:
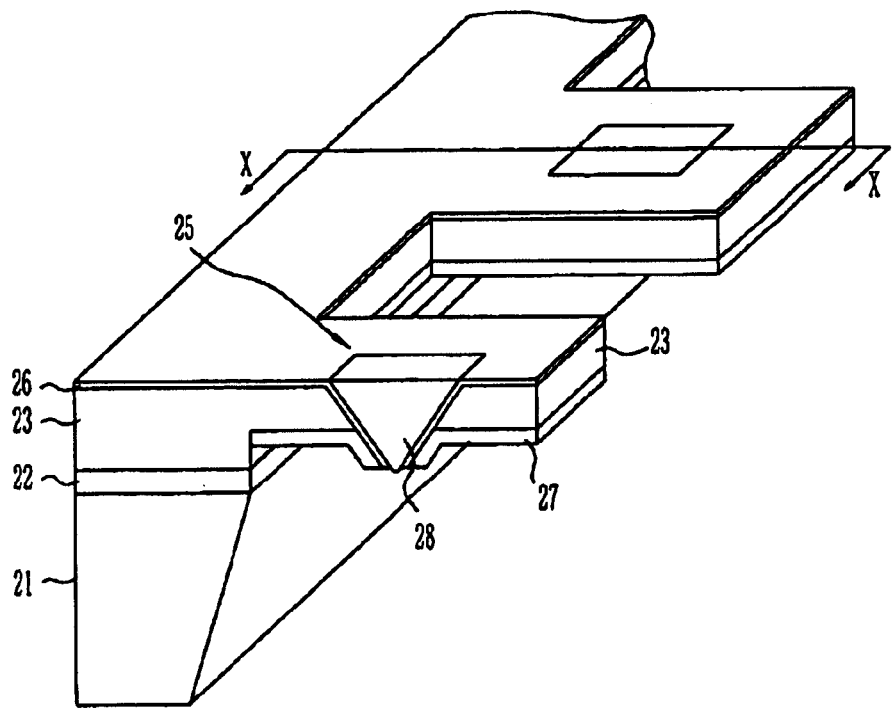
FIG. 3 is a perspective view of a head for recording/reproducing optical data according to the present invention.

FIG. 3 is a perspective view of a head for recording/reproducing optical data according to the present invention.

Referring now to FIG. 3, the head for recording/reading optical data is mainly divided into two sections: a lower structure and an upper structure. The lower structure includes a silicon substrate 21 and finally becomes a holder of the head. The upper structure has a reverse-trapezoid shape and includes a probe having a plurality of apertures 25 filled with a non-linear material 28 and a thin metal film 27, wherein an end portion of the probe is connected to the lower structure.

The upper structure further includes a silicon deposition layer 23. A silicon oxide film 22 is formed at the boundary of the lower structure and the upper structure. A plurality of the probes having the thin metal film 27 are formed at the bottom of the upper structure. A portion of the non-linear material 28 filled in the aperture 25 of a reverse-trapezoid shape by etching process, formed in the silicon de position layer 23, is exposed toward the bottom of the silicon deposition layer 23 included in the upper structure.

A method of manufacturing the head for recording/reproducing optical data will be below described.

FIGS. 4a through 4i are cross-sectional views for explaining a method of manufacturing the head for recording/reproducing optical data according to the present invention, which shows a process of manufacturing the head for recording/reproducing optical data taken along lines X—X' in FIG. 3 step by step.

Figure 4A:
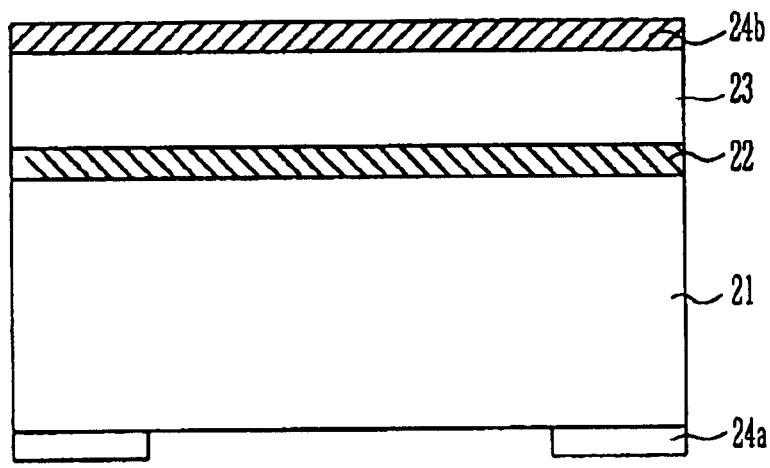
FIG. 4a to FIG. 4i are cross-sectional views for explaining a method of manufacturing a head for recording/reproducing optical data according to the present invention.

Referring now to FIG. 4a, a silicon oxide film 22 is formed on a silicon substrate 21. Then, silicon is deposited on the silicon oxide film 22 to form a silicon deposition layer 23. First and second nitride films 24a and 24b are formed at the bottom of the silicon substrate 21 and the top of the silicon deposition layer 23. Next, the first nitride film 24a formed at the bottom of the silicon substrate 21 is patterned to expose a given portion of the bottom of the silicon substrate 21. At this time, the width of the exposed silicon substrate 21 is 1~10 mm$^2$.

In the above, it should be understood that a silicon oxide film or a silicon nitride film might be used instead of the nitride film.

Figure 4B:
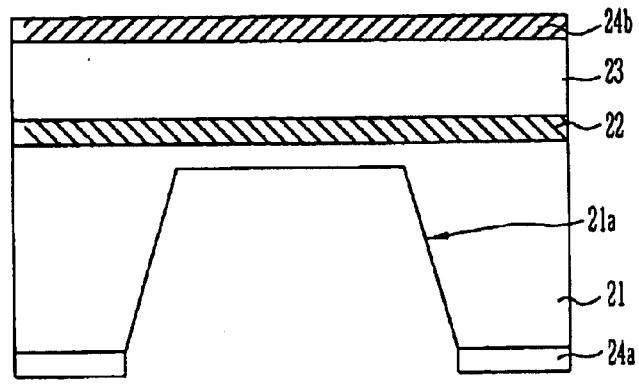

Referring now to FIG. 4b, the bottom of the exposed silicon substrate 21 is etched by a first etch process. The bottom of the silicon substrate 21 is etched in about 100~1000 $\mu$m and an oblique plane 21a becomes (111) of silicon.

The first etch process is performed with a wet etch, by which a given thickness of the silicon substrate 21 remains from the silicon oxide film 22. This is to physically protect the silicon deposition layer 23 since the thickness of the silicon deposition layer 23 is relatively thinly formed than the thickness of the silicon substrate 21.

Figure 4C:
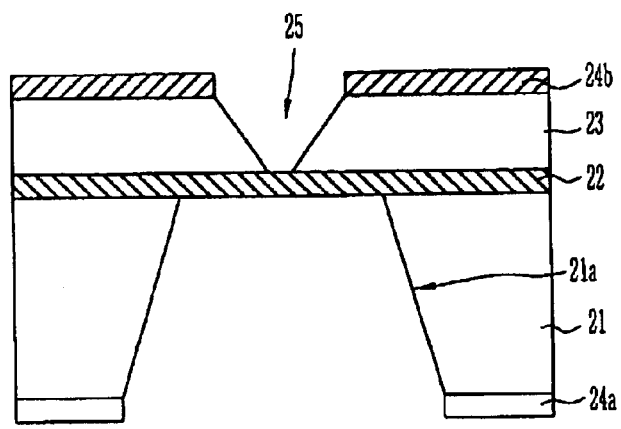

Referring now to FIG. 4c, the second nitride film 24b formed on the top of the silicon deposition layer 23 is patterned to expose a given region of the silicon deposition layer 23. Then, a second etch process is performed to form a plurality of apertures 25 (only one is shown in the drawing).

At this time, the second etch process is performed with a wet etch. The aperture 25 has a reverse-trapezoid shape by a recipe of the second etch process. The silicon oxide film 22 is exposed at the bottom of the aperture 25. At this time, etching is performed at the bottom of the silicon substrate 21 where the first nitride film 24a is not formed, so that the remaining silicon substrate is removed and the bottom of the silicon oxide film 22 is exposed. Thus, the silicon substrate 21 is divided centering on the aperture 25.

A lower base of the aperture 25 is 10~100 nm in size and the top of the aperture 25 is 1 $\mu$m~100 $\mu$m in size. At this time, the depth of the aperture 25 functioning as a waveguide is 1 $\mu$m~10 $\mu$m.

Figure 4D:
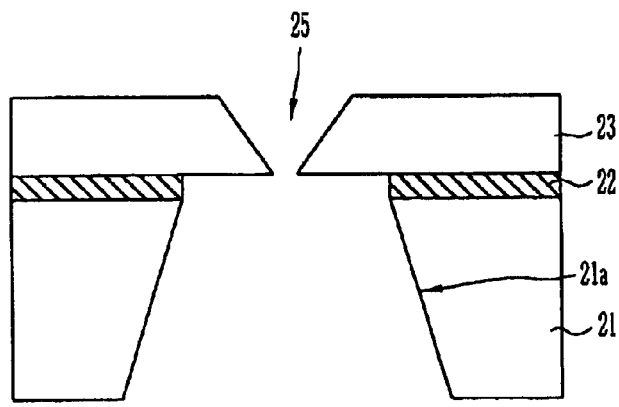

Referring now to FIG. 4d, the first and second nitride films 24a and 24b and the silicon oxide film 22 exposed at the bottom of the silicon substrate 21 are removed.

Figure 4E:
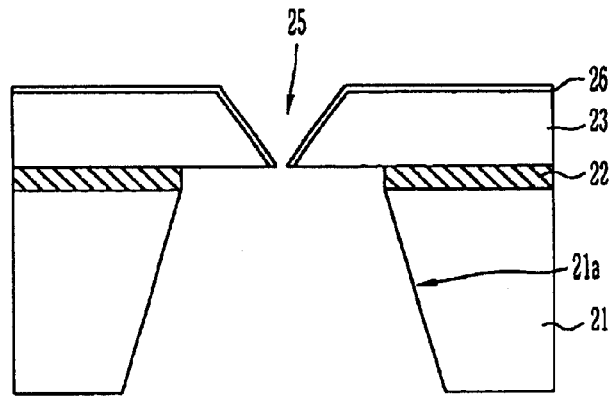

Referring to FIG. 4e, a dielectric film 26 is formed on the silicon deposition layer 23 including the aperture 25. The dielectric film 26 is formed to be a pattern through which a given region of the silicon deposition layer 23 between the aperture 25 and another aperture (not shown) is exposed.

Figure 4F:
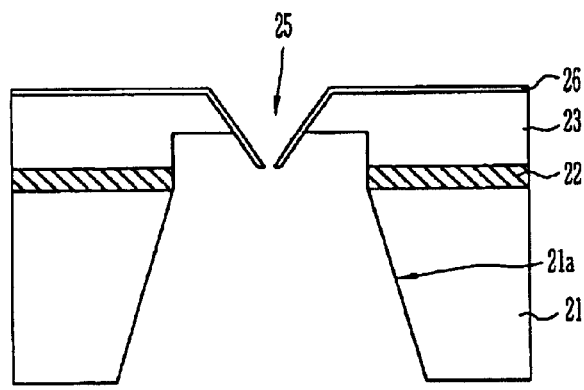

Referring now to FIG. 4f, the exposed portion of the bottom of the silicon deposition layer 23 is removed by a given thickness by means of an etch process. The top of the silicon deposition layer 23 is not etched by the dielectric film 26. The silicon deposition layer 23 at a region between the aperture 25 where the dielectric film 26 is not formed and another aperture (not shown) is completely etched/removed. At this time, the dielectric film 26 formed in the aperture 25 is not etched to have a reverse-trapezoid shape intact.

Figure 4G:
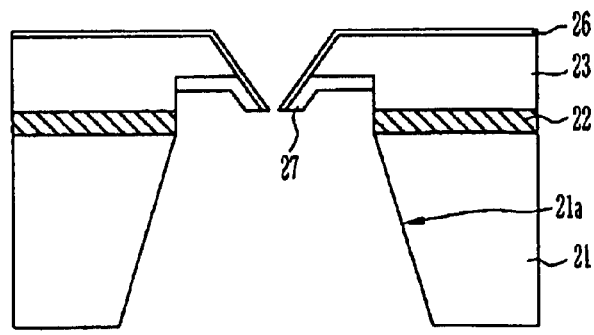

Referring now to FIG. 4g, a thin metal film 27 is formed on both the bottoms of the silicon deposition layer 23 and the dielectric film 26. Thus, a probe consisting of the thin metal film 27 is formed.

The thin metal film 27 is formed to overcome the diffraction limit optically and is formed using aluminum in thickness of about 100 nm.

Figure 4H:
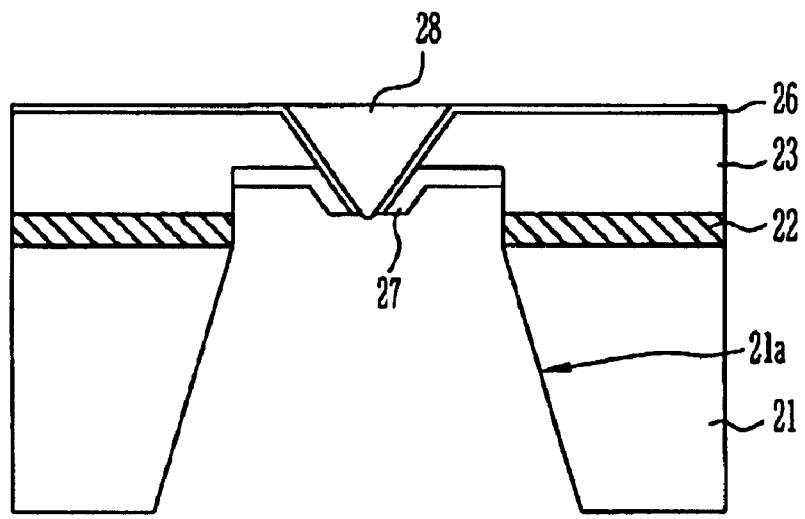

Referring now to FIG. 4h, a non-linear material 28 is buried into the aperture 25.

The non-linear material 28 is a material that can generate a self-focusing phenomenon and is made of a material a third non-linear coefficient of which is very great. The material that is great in a third non-linear coefficient includes $AS_2S_3$. The temperature when the aperture 25 is filled with $AS_2S_3$ is about 120° C. At this time, as beam could not be self-focused by about one wavelength size if the aperture 25 is not completely buried when the non-linear material 28 is buried, the aperture 25 is completely buried with the non-linear material 28.

Figure 4I:
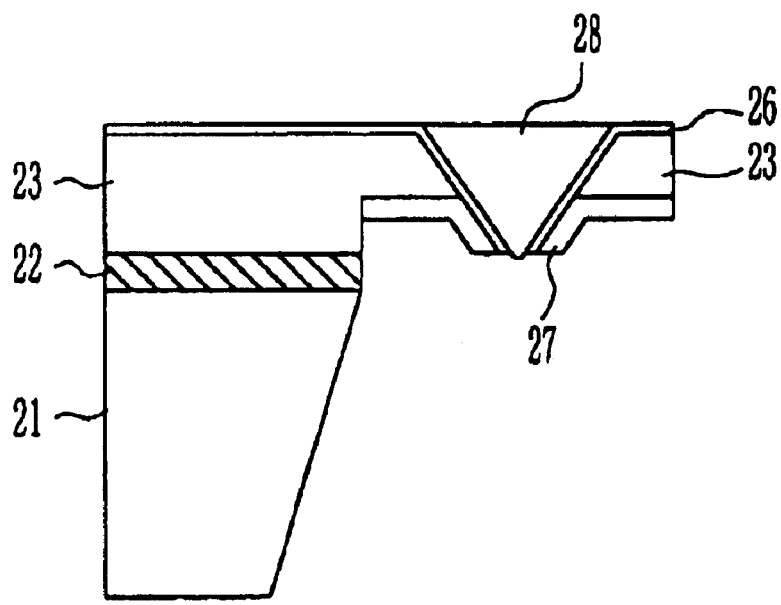

Referring now to FIG. 4i, the silicon substrate 21, the silicon oxide film 22 on the silicon substrate 21, the silicon deposition layer 23 and the dielectric film 26, at one side, are removed. Thus, the head for recording/reproducing optical data shown in FIG. 3 is completed.

The shape of beam reaching around the aperture 25 of about below 100 nm in size formed in the silicon deposition layer 23 by the above process is determined by the amount of beam, the intensity of an incident beam and the amount of a third non-linear coefficient. In order to form the aperture 25 having a high transmissivity, it is required that the shape of beam reaching around the aperture 25 have a shape having a parabolic structure the cone angle of which is very large.

Figure 5:
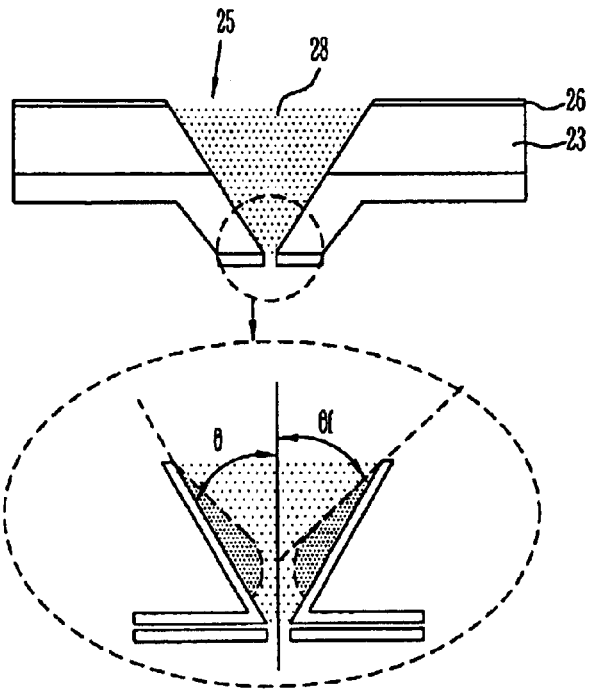
FIG. 5 shows a state showing a self-focusing phenomenon generated within apertures in which a non-linear material is buried.

FIG. 5 shows a state showing a self-focusing phenomenon generated within apertures in which a non-linear material is buried.

Referring now to FIG. 5, the aperture 25 filled with a non-linear material 28, the beam reaching a lower base of the aperture 25 is incident at an angle of θ f greater than θ and has a parabolic structure having a very large cone angle. Also, it could be seen that the amount of beam has about half wavelength. Therefore, the aperture 25 can have a high throughput that is improved by several hundreds times than the throughput of a conventional optical fiber probe.

As a result, in order to improve the throughput of the aperture 25, the beam reaching a lower base of the aperture 25 must be incident in a parabolic structure having a very large cone angle, as shown in FIG. 5.

Figure 6:
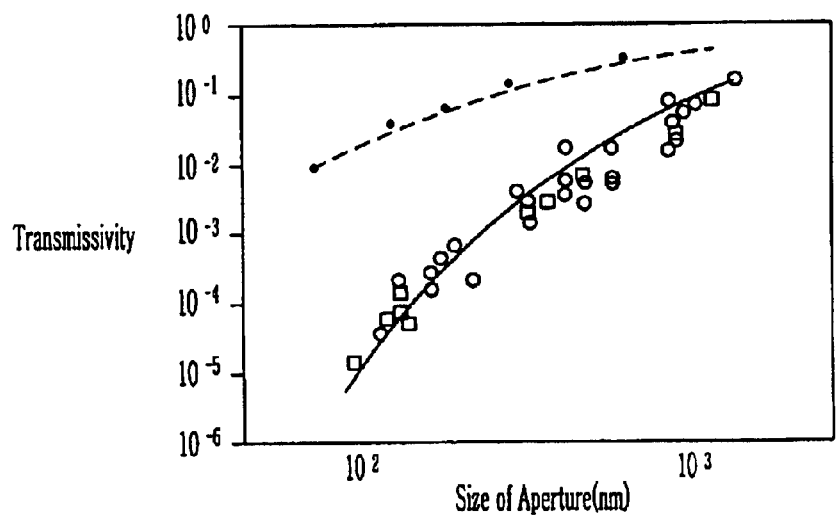
FIG. 6 is a characteristic graph illustrating the throughput depending on the size of the apertures.

FIG. 6 is a characteristic graph illustrating the throughput depending on the size of the apertures.

Referring now to FIG. 6, it could be seen that the throughput of the aperture is improved by over several hundreds times by the calculated throughput.

Figure 7:
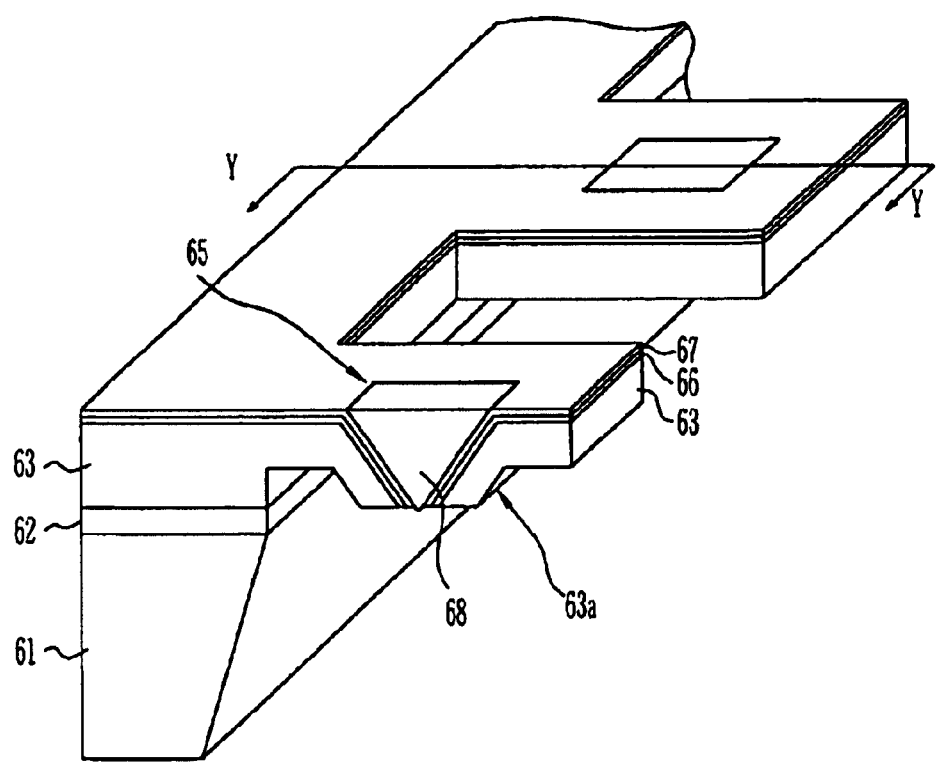
FIG. 7 is a perspective view of a head for recording/reproducing optical data according to another embodiment of the present invention.

FIG. 7 is a perspective view of a head for recording/reproducing optical data according to another embodiment of the present invention; and Referring now to FIG. 7, a head for recording/reproducing optical data is mainly divided into two sections; a lower structure and an upper structure. The lower structure includes a silicon substrate 61 and finally becomes a holder of the head. The upper structure includes a plurality of aperture 65 filled with a non-linear material 68 having a reverse-trapezoid shape. The bottom of the upper structure has a probe structure and actually functions as a probe 63a and the end portion of the upper structure is connected to the lower structure.

As in FIG. 3, the upper structure further includes a silicon deposition layer 63. A silicon oxide film 62 is formed at the boundary of the lower structure and the upper structure. A part of the non-linear material 68 buried in the aperture 65 of a reverse-trapezoid shape, formed in the silicon deposition layer 63 by an etch process, is exposed toward the bottom of the silicon deposition layer 63 in the upper structure. The difference from the head for recording/reproducing optical data shown in FIG. 3, is that additional probe need not be formed using a thin metal film since the bottom of the silicon deposition layer 63 is formed to be a probe type shape by an etch process. As a result, as the silicon deposition layer 63 functioning as the holder of the probe functions as a probe, the holder of the probe and the probe are integrally formed.

A method of manufacturing the head for recording/reproducing optical data will be below described.

FIGS. 8a through 8g are cross-sectional views for explaining a method of manufacturing the head for recording/reproducing optical data according to another embodiment of the present invention, which shows a process of manufacturing the head for recording/reproducing optical data taken along lines Y–Y' in FIG. 7 step by step.

Processes shown in FIGS. 8a through 8d are same those shown in FIG. 4a to FIG. 4e. Thus, the explanation will be omitted for the purpose of simplicity.

Figure 8A:
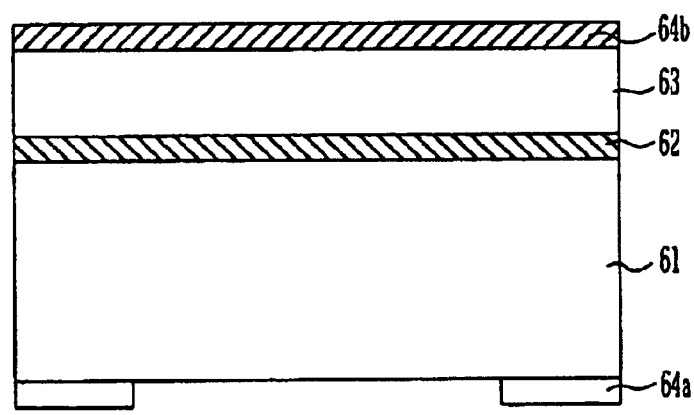
FIG. 8a to FIG. 8g are cross-sectional views for explaining a method of manufacturing a head for recording/reproducing optical data according to another embodiment of the present invention.
Figure 8B:
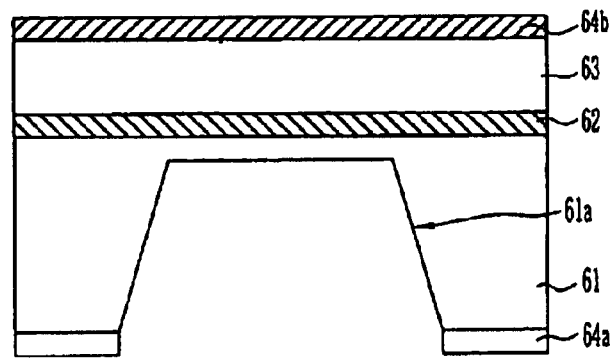
Figure 8C:
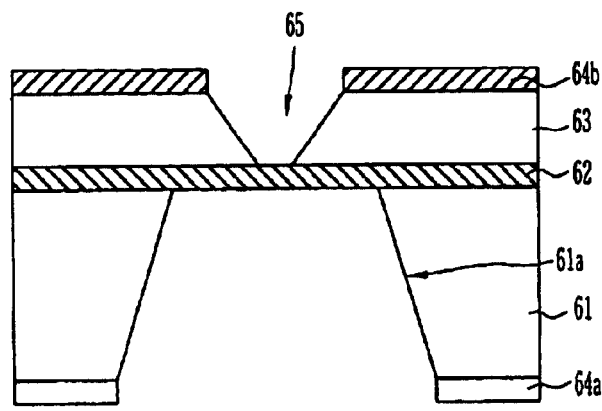
Figure 8D:
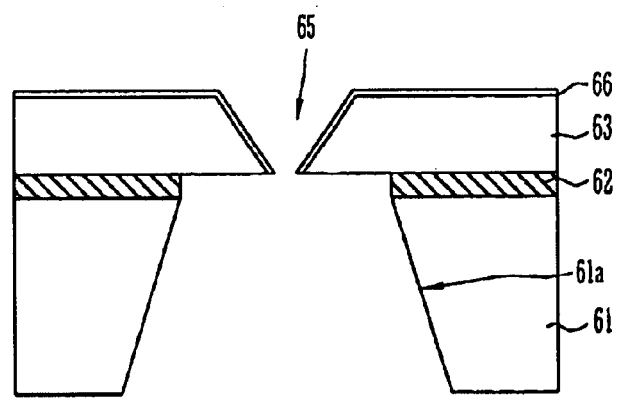
Figure 8E:
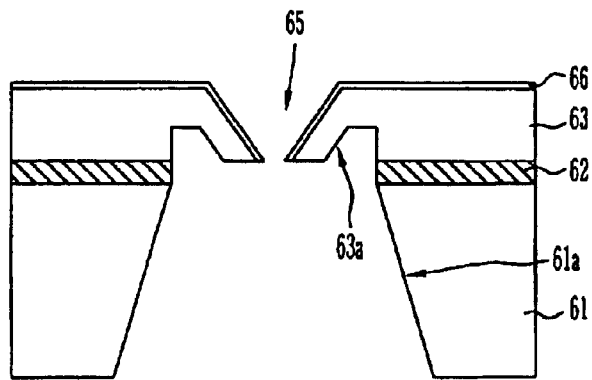

Referring now to FIG. 8e, a portion exposed at the bottom of the silicon deposition layer 63 is removed by a given thickness by means of an etch process, wherein the bottom of the silicon deposition layer 63 is etched along the slant angle of the aperture 65 while a portion where the aperture 65 is formed has a given thickness. Thereby, a probe 63a including the silicon deposition layer 63 of a given thickness is formed at the bottom of the aperture 65.

At this time, the top of the silicon deposition layer 63 is not etched by a dielectric film 66, and the silicon deposition layer 63 at a region between the aperture 65, where the dielectric film 66 is not formed, and another aperture is completely removed.

Figure 8F:
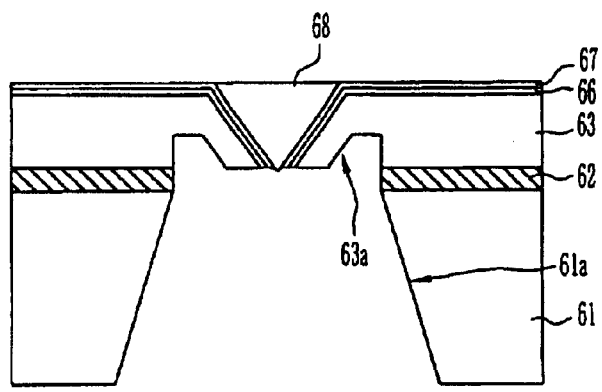

Referring now to FIG. 8f, a thin metal film 67 is formed on the dielectric film 66 including the region where the aperture 65 is formed. Next, the aperture 65 is completely filled with a non-linear material 68.

The thin metal film 67 is formed to further improve the throughput of the aperture 65 and is formed in thickness of about 100 nm using aluminum.

The non-linear material 68 is a material that can generate a self-focusing phenomenon and is made of a material a third non-linear coefficient of which is very great, as described with respect to FIG. 4h. For example, the aperture 65 is completely buried using $AS_2S_3$ that maintains the temperature of about 120° C. and is great in the third non-linear coefficient. At this time, as beam could not be self-focused by about one wavelength size if the aperture 65 is not completely buried when the non-linear material 68 is buried, the aperture 65 is completely buried with the non-linear material 68.

Figure 8G:
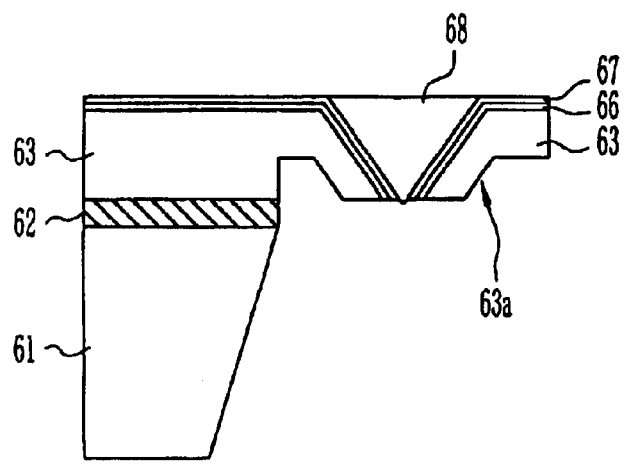

Referring now to FIG. 8g, the silicon substrate 61, the silicon oxide film 62 on the silicon substrate 61, the silicon deposition layer 63 and the dielectric film 66, at one side, are removed. Thus, the head for recording/reproducing optical data shown in FIG. 7 is completed.

Similarly, the shape of beam reaching around the aperture 65 of about below 100 nm in size formed in the silicon deposition layer 63 by the above process is determined by the amount of beam, the intensity of an incident beam and the amount of a third non-linear coefficient.

As mentioned above, the present invention has advantages that it can improve the transmissivity by burying an aperture with a non-linear material and can record/read optical data at a high speed using apertures arranged in plurality. For example, if the size of the aperture is about 50 nm, the recording density may be several Giga bit/$inch^2$, which surpasses a current information storage capacity. Also, the aperture of a high throughput can be used for physical properties of a high resolution as well as a head of a high-density optical information storage device and the like.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A method of manufacturing a head for recording and reading optical data, comprising the steps of:
   providing a silicon substrate on which a silicon oxide film and a silicon deposition layer are stacked;
   etching the bottom of said silicon substrate by a given depth to form an opening;
   forming an aperture having a given slant angle in said silicon deposition layer located on said opening;
   etching a portion of said silicon oxide film, the portion exposed through the opening;
   forming a dielectric layer on said silicon deposition layer including said aperture;
   removing an exposed portion of the bottom of said silicon deposition layer by a given thickness to expose a portion of said dielectric layer;
   forming a probe on the exposed portion of said dielectric layer and said silicon deposition layer around said aperture exposed through said opening; and
   burying said aperture with a non-linear material.

2. A method of manufacturing a head for recording and reading optical data as claimed in claim 1, wherein the silicon substrate remaining in said opening is completely removed in the process of forming said aperture.

3. A method of manufacturing a head for recording and reading optical data as claimed in claim 1, wherein said aperture has a reverse-trapezoid shape in which the length of a lower plane of said aperture is 10~100 nm and the length of an upper plane of said aperture is 1 μm~100 μm.

4. A method of manufacturing a head for recording and reading optical data as claimed in claim 1, wherein said probe is made of a thin metal film.

5. A method of manufacturing a head for recording and reading optical data as claimed in claim 1, wherein said non-linear material induces a self-focusing phenomenon and is made of a material of a third non-linear coefficient.

6. A method of manufacturing a head for recording and reading optical data as claimed in claim 1, wherein said non-linear material is made of $As_2S_3$ and is buried at the temperature of about 120° C.

7. A method of manufacturing a head for recording and reading optical data as claimed in claim 1, further comprising a step of forming a thin metal film on said dielectric layer including said aperture after said probe is formed.

8. A method of manufacturing a head for recording and reading optical data as claimed in claim 4, or 7, wherein said thin metal film is made of aluminum.

9. A method of manufacturing a head for recording and reading optical data, comprising the steps of:

providing a silicon substrate on which a silicon oxide film and a silicon deposition layer are stacked;

etching the bottom of said silicon substrate by a given depth to form an opening;

forming an aperture having a given slant angle in said silicon deposition layer located on said opening;

etching a portion of said silicon oxide film, the portion exposed through the opening;

forming a dielectric layer on said silicon deposition layer including said aperture;

removing a portion of the bottom of said silicon deposition layer to form a probe under said dielectric layer of said aperture, said probe having the same slant angle as that of said aperture; and burying said aperture with a non-linear material.

10. A method of manufacturing a head for recording and reading optical data as claimed in claim 9, further comprising a step of forming a thin metal film on said dielectric layer including said aperture after said probe is formed.

11. A method of manufacturing a head for recording and reading optical data as claimed in claim 9, wherein the silicon substrate remaining in said opening is completely removed in the process of forming said aperture.

12. A method of manufacturing a head for recording and reading optical data as claimed in claim 9, wherein said aperture has a reverse-trapezoid shape in which the length of a lower plane of said aperture is 10~100 nm and the length of an upper plane of said aperture is 1 μm~100 μm.

* * * * *